(No Model.)

J. C. MILLER.
FILLING INDICATOR FOR LAMPS.

No. 532,981. Patented Jan. 22, 1895.

UNITED STATES PATENT OFFICE.

JOHN C. MILLER, OF WATERBURY, CONNECTICUT, ASSIGNOR TO THE MATTHEWS & WILLARD MANUFACTURING COMPANY, OF SAME PLACE.

FILLING-INDICATOR FOR LAMPS.

SPECIFICATION forming part of Letters Patent No. 532,981, dated January 22, 1895.

Application filed February 17, 1894. Serial No. 500,529. (No model.)

*To all whom it may concern:*

Be it known that I, JOHN C. MILLER, of Waterbury, in the county of New Haven and State of Connecticut, have invented a new Improvement in Filling-Indicators for Lamps; and I do hereby declare the following, when taken in connection with accompanying drawings and the letters of reference marked thereon, to be a full, clear, and exact description of the same, and which said drawings constitute part of this specification, and represent, in—

Figure 1:
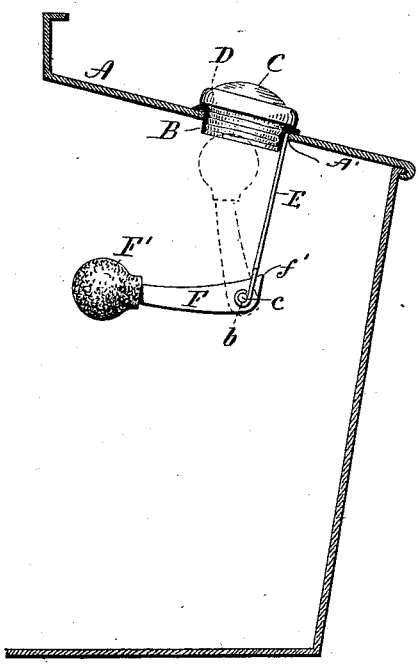
Figure 2:
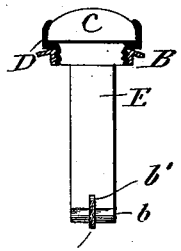

Figure 1, a broken view partly in elevation and partly in vertical section of one form which an indicator constructed in accordance with my invention may assume; Fig. 2, a detached broken view of the indicator, the transparent cover, and its setting being shown in section and the float being broken away.

My invention relates to an improvement in indicators, particularly designed for the founts of oil-burning lamps, though not limited to use in that situation, the object being to produce a simple and reliable device for indicating to the person filling the fount when the same is filled.

With these ends in view, my invention consists in certain details of construction as will be hereinafter described and pointed out in the claim.

I have chosen to illustrate my invention as applied to a lamp-fount A, which may of course be of any suitable construction. In the top of the fount I locate a small flanged, internally threaded collar B, which is soldered, or otherwise secured in a circular opening A' in the fount, so as to form an oil-tight joint. In this collar I locate a transparent cover C, made of glass or other suitable material, and mounted in a setting consisting of an externally threaded sheet-metal sleeve D, having its upper end enlarged so as to be spun over the edge of the cover C.

To the collar B, before mentioned, I firmly secure the upper end of a carrier E, which as shown consists of a strip of sheet-metal slightly bowed transversely, and having its lower end turned inward upon itself to form a tube $b$, to receive the pin $c$, on which the stem F of the float F' is pivoted. The said stem consists of a small piece of sheet-metal, while the float may be formed of any buoyant material, such as cork.

By preference the float will be colored by a pigment applied directly to it or be covered with a thin envelope of shining foil, so as to make it show better through the glass C.

The inner end of the stem F extends into a vertical slot $b'$ formed in the lower end of the carrier E, and is constructed to form a stop $f'$ which engages with the outer face of the carrier adjacent to the upper end of the said slot, as shown in Fig. 1 of the drawings, so as to stop the float from falling below a horizontal position, as shown, or below a position from which it is readily lifted.

It will be readily understood from an inspection of the drawings that as the oil is lowered in the fount, the float will descend and pass out of range of the glass C, and on the other hand when the fount is filled, the oil will cause the float to rise so as to stand directly under the glass D, where it will indicate to the person filling the fount that the same is full. By pivoting the float as described, the friction of its operation and the liability of its derangement are reduced to the minimum, whereby it serves to unfailingly indicate when to stop pouring oil into the fount.

I wish particularly to call attention to the fact, also, that by mounting the float pivotally, no fouling of the parts of the indicator by long disuse of the lamp can interfere with its operation, inasmuch as the leverage of the float will always be sufficient to overcome the retarding action of any gummed oil.

I am aware that it is old to locate a transparent cover in a lamp fount and provide the same with a float arranged to rise and fall in such a manner as to be observed through the said cover. I am also aware that it is old to provide an oil-fount with a pivotal float arranged to rise and fall so as to be observed through an opening in the top of the fount. I do not therefore claim either of these constructions broadly.

Having fully described my invention, what I claim as new, and desire to secure by Letters Patent, is—

The combination with a lamp-fount or other vessel, of an internally threaded flanged collar located in an opening formed in the top thereof, a transparent cover set in an externally threaded sleeve adapted to be entered into the said collar, a sheet-metal arm secured to the collar and extending downward into the lamp, and forming a carrier, a float-stem entering a slot formed in the lower end of the said carrier to which it is pivoted, and constructed at its inner end to form a stop which engages with the outer face of the lower end of the said arm to limit the downward movement thereof and a float secured to the outer end of the said stem, substantially as described.

In testimony whereof I have signed this specification in the presence of two subscribing witnesses.

JOHN C. MILLER.

Witnesses:
  R. F. GRIGGS,
  F. C. EARLE.